United States Patent
Dow et al.

(10) Patent No.: US 6,549,304 B1
(45) Date of Patent: Apr. 15, 2003

(54) SCANNING APPLIANCE AND METHOD HAVING USER HELP CAPABILITY

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,080

(22) Filed: Aug. 7, 1998

(51) Int. Cl.[7] .............................................. H04N 1/024
(52) U.S. Cl. ...................................... 358/473; 358/444
(58) Field of Search ................................ 358/471, 473, 358/474, 444; 282/312, 313, 314, 315; 348/231, 232, 262, 260, 266; 345/156

(56) References Cited

U.S. PATENT DOCUMENTS 5,595,445 A * 1/1997 Bobry .......................... 400/88
5,686,937 A * 11/1997 Li ............................... 345/123
5,877,746 A    3/1999 Heiko et al. ................. 345/156
5,892,971 A * 4/1999 Danielson et al. ........... 395/287
5,978,016 A * 11/1999 Lourette et al. ............. 348/231

FOREIGN PATENT DOCUMENTS

EP        0 649 243        4/1995        ............ H04N/1/00

* cited by examiner

Primary Examiner—Cheukfan Lee

(57) ABSTRACT

A hand-held image capture and communication appliance and method of using same are provided wherein images may be scanned and saved in an internal memory. The appliance includes a processor for manipulating and exhibiting the images on a built-in display screen. Program code stored in the internal memory includes a help utility module that allows the user to obtain information on operating the various features of the appliance. The help utility module includes code segments for displaying a textual dialog and/or an animation that convey information correlated with the help topics. Advantageously, animation can be used to demonstrate features that would be difficult to explain in words or would require a lengthy dialog. For those topics requiring a more extensive textual explanation or if it is desired to combine a textual discussion with an animation, the help utility module includes a code segment for scrolling the display to communicate multiple screens or pages of information to the user.

62 Claims, 11 Drawing Sheets

Capturing a page

- Keep appliance in contact with page.
- Press and hold copy button while copying.
- Overlap copy paths by at least 1/2 inch.
- Release copy button or lift appliance off page to stop.

More    Cancel

SCANNING APPLIANCE AND METHOD HAVING USER HELP CAPABILITY

CROSS REFERENCE TO RELATED APPLICATIONS

This application is related to U.S. application Ser. No. 09/130,869, entitled "APPLIANCE AND METHOD OF USING SAME HAVING A SEND CAPABILITY FOR STORED DATA", U.S. application Ser. No. 09/130,573, entitled "APPLIANCE AND METHOD OF USING SAME FOR CAPTURING IMAGES", U.S. application Ser. No. 09/130,082, entitled "APPLIANCE AND METHOD OF USING SAME HAVING A DELETE CAPABILITY FOR SAVED DATA", U.S. application Ser. No. 09/130,789, entitled "APPLIANCE AND METHOD OF USING SAME HAVING A CAPABILITY TO GRAPHICALLY ASSOCIATE AND DISASSOCIATE DATA WITH AND FROM ONE ANOTHER", U.S. application Ser. No. 09/130,081, entitled "APPLIANCE AND METHOD FOR COMMUNICATING AND VIEWING MULTIPLE CAPTURED IMAGES", U.S. application Ser. No. 09/130,594, entitled "APPLIANCE AND METHOD FOR NAVIGATING AMONG MULTIPLE CAPTURED IMAGES AND FUNCTIONAL MENUS", U.S. application Ser. No. 09/130,872, entitled "APPLIANCE AND METHOD FOR CAPTURING IMAGES HAVING A USER ERROR INTERFACE", U.S. application Ser. No. 09/130,258, entitled "APPLIANCE AND METHOD FOR VIEWING CAPTURED IMAGES", and U.S. application Ser. No. 09/130,868, entitled "APPLIANCE AND METHOD FOR MENU NAVIGATION", which are filed contemporaneously herewith and are incorporated herein by reference.

BACKGROUND OF THE INVENTION

The present invention relates generally to the field of graphical user interfaces, and, more particularly, to a portable hand-held appliance for capturing images through digital scanning that has a graphical user interface for displaying the captured images for user manipulation and processing, and communicating those images to another device or appliance.

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or personal computer (PC) fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animation to assist users in operating their device. Finally, transfer of images is limited to those devices having ports for receiving an external memory card or the capability of reading the scanner memory through a memory card drive.

Accordingly, what is sought is a portable, hand-held image capturing device that allows users to process or manipulate captured images in the device and the ability to communicate the images directly to some other unit such as a computer, printer, or facsimile machine. In addition, the image capturing device should provide cordless operation and use a standard interface for transferring images to other devices. A GUI is preferred to assist users, particularly novices, in operating the device.

SUMMARY OF THE INVENTION

Certain novel features and advantages of the invention will be set forth in the description that follows and will become apparent to those skilled in the art upon examination of the following or may be learned with the practice of the invention.

To achieve the novel features and advantages, the present invention is generally directed to a portable hand-held image capture and communication appliance and method of using same by which images may be captured via capturing means and saved in an internal memory. The appliance includes a processor for manipulating and exhibiting the images on a built-in display screen. Program code stored in the internal memory and executed by the processor includes a help utility module that allows the user to obtain information on operating the various features of the appliance.

According to an aspect of the invention, the program code includes a menu/navigation module that provides the user with a list of help topics and processes any user selection thereof.

According to another aspect of the invention, the help utility module includes code segments for displaying a textual dialog and still graphics or an animation that convey information correlated with the help topics. Advantageously, animation can be used to demonstrate features that would be difficult to explain in words or would require a lengthy dialog. For those topics requiring a more extensive textual explanation or if it is desired to combine a textual discussion with an animation, the help utility module includes a code segment for scrolling the display to communicate multiple screens or pages of information to the user. The user is informed of this capability through a scroll icon depicted on the display, which, in the preferred embodiment, portrays the navigation buttons on the appliance used to scroll between screens.

The appliance according to the present invention has many advantages, a few of which are highlighted hereafter, as examples.

One advantage of the invention is that intelligent image processing features, normally reserved for a traditional computer, are provided in a portable, hand-held image capturing appliance.

Another advantage of the invention is that a user is provided with helpful instruction on operating the device through a simple menu request without having to consult an external manual.

Still another advantage of the invention is that user help for some topics is provided through animation, which conveys an abundance of information for those topics where textual descriptions are less effective.

Yet another advantage of the invention is that a GUI is provided that, in conjunction with help utility, allows new users to operate the appliance with minimal training or assistance.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1A:
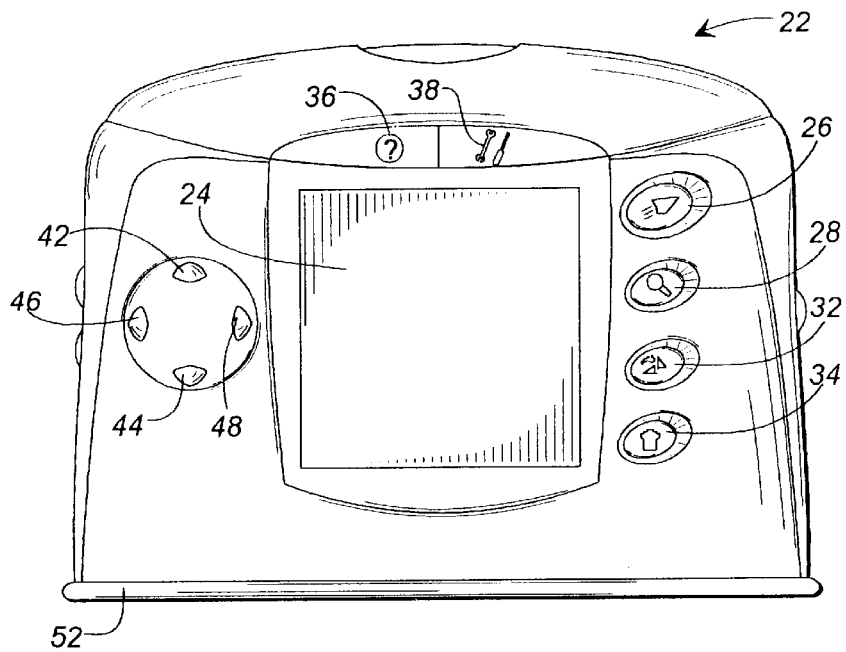
FIG. 1A is an elevation view of the hand-held image capture and communication appliance according to the present invention, which depicts a side of the unit containing the display screen, operation buttons, and navigation buttons.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, and liquid crystal displays (LCDs). Display 24 is the means by which information, including captured images, text, icons, and animation, is communicated to the user. As used herein, the term "image" encompasses both text (binary) and color, graphic, or gray-scale visuals. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been captured into memory through photoelement array 52. Note that an image captured in memory is interchangeably referred to herein as a "page" because the image is portrayed in appliance 22 as a physical page of text and/or imagery. Activation of tools button 38 presents the user with a menu that includes possible image operations (e.g., image attachment/grouping, image detachment/ungrouping), changing the mode of appliance 22 (i.e., toggling between text (binary) capture and color, graphic, or grayscale capture modes), calibrating appliance 22, displaying a screen identifying important specifications such as a model number, hardware or software release number, memory equipage, etc., or other user utilities not deserving of a dedicated external button for activation. Help button 36 provides the user with access to general tutorials, process animations, how-to instructions on the operation of appliance 22, and context sensitive instruction when help is requested while another operation or menu is active. The navigation buttons include an up button 42, a down button 44, a left button 46, and a right button 48 and are controlled by the user to steer a course through menu items and to view images or pages that have been captured in memory.

Figure 1B:
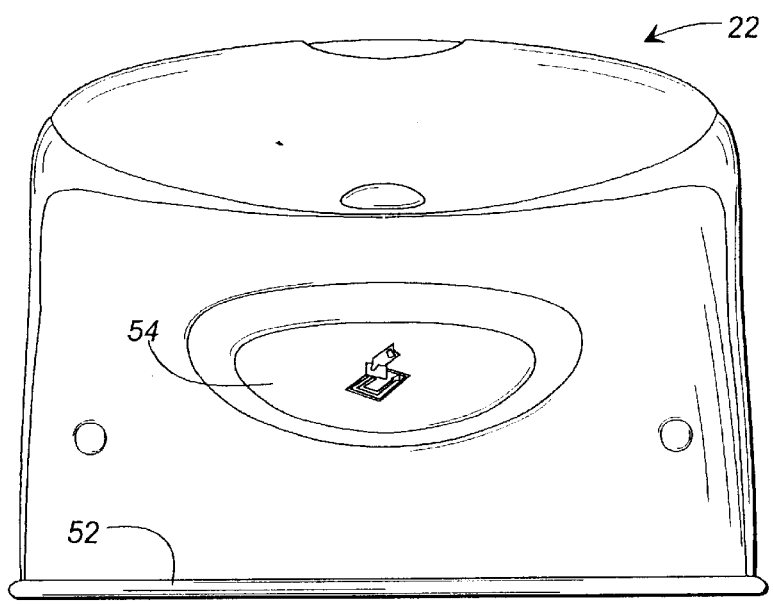
FIG. 1B is an elevation view of the appliance of FIG. 1A depicting the opposing side to that illustrated in FIG. 1A, which contains the capture button for performing an image capture.
Figure 1C:
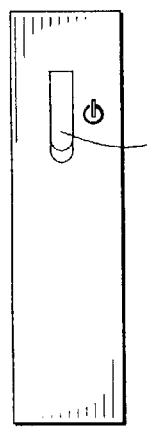
FIG. 1C is an elevation view of the appliance of FIGS. 1A and 1B depicting an end of the unit, which contains the power switch.
Figure 1D:
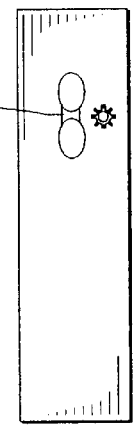
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to capture an image through photoelement array 52 and is released once the image is captured. A power switch 56 is included at one end of appliance 22 as shown in FIG. 1C and a brightness control 58 for display 24 is located at the other end of appliance 22 as shown in FIG. 1D. The positioning of the various buttons, power switch 56, and brightness control 58 on appliance 22 as shown in FIGS. 1A through 1D is merely exemplary and can be modified as needed to satisfy the ergonomic requirements of the targeted user community.

Figure 2:
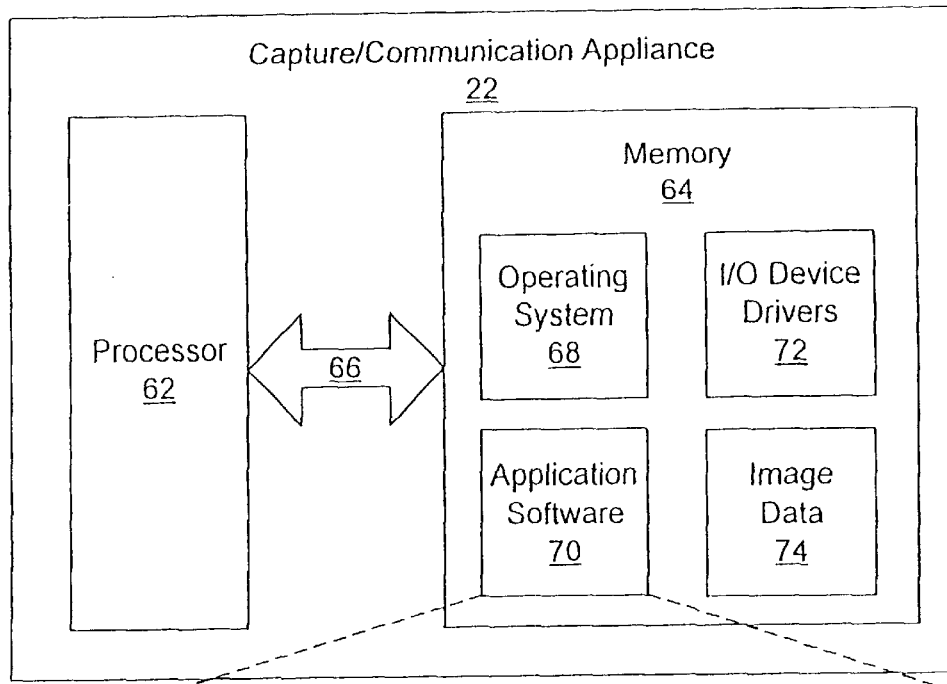
FIG. 2 is a high-level block diagram of the internal hardware and software architecture of the appliance illustrated in FIGS. 1A–1D.
Figure 2:
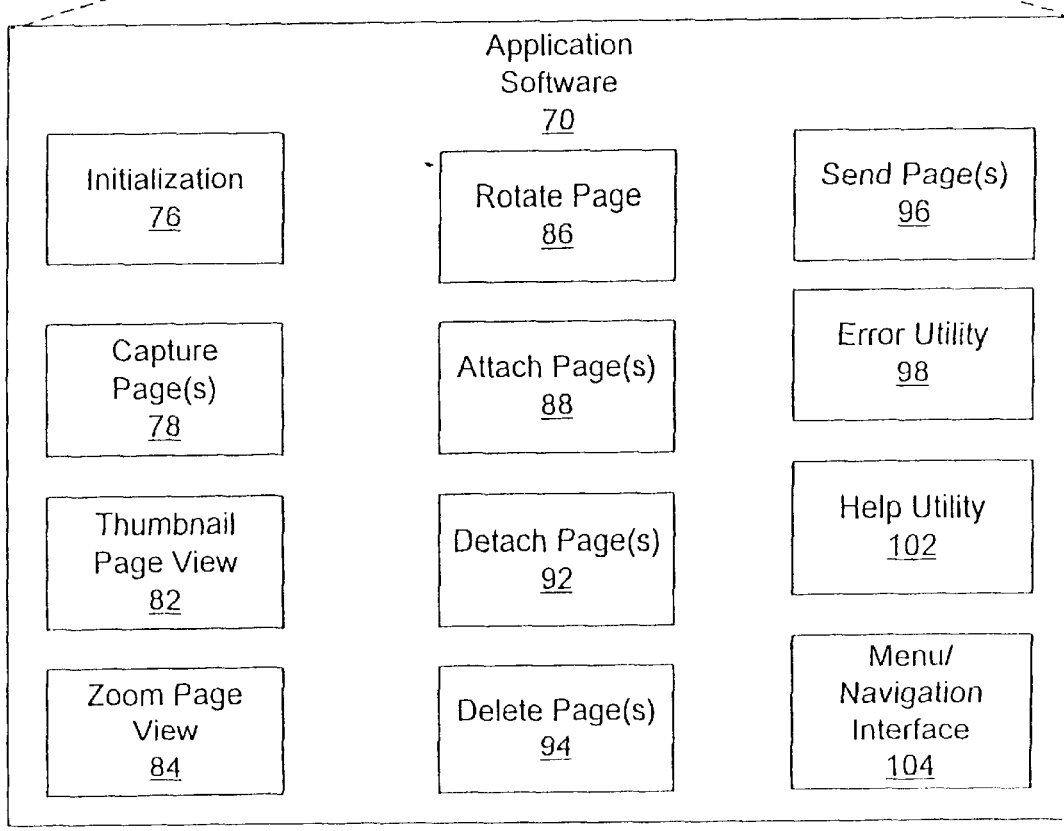

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each capture. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., 3260 Jay Street, Santa Clara, Calif. 95054-3309, which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the CCITT standard, which is used in the preferred embodiment of the present invention; however, other public or proprietary standards can be used with equal success. For example, JPEG is a common standard used to encode graphic or color images. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72. Assembly language is used to implement time-critical code segments.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. A brief overview of each of the aforementioned modules follows hereafter.

Figure 8A:
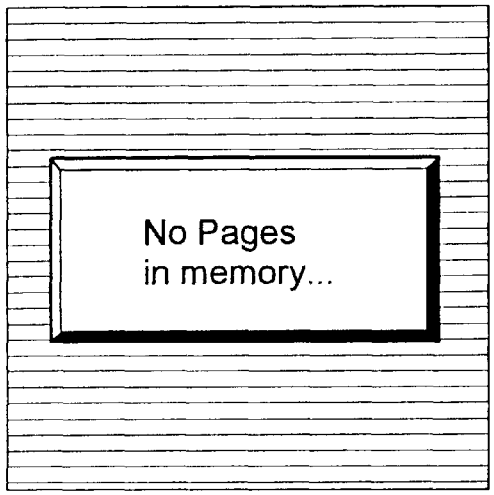
FIGS. 8A and 8B depict memory usage indicator icons on the display screen of FIG. 1A that provide a memory utilization report for the appliance.
Figure 8B:
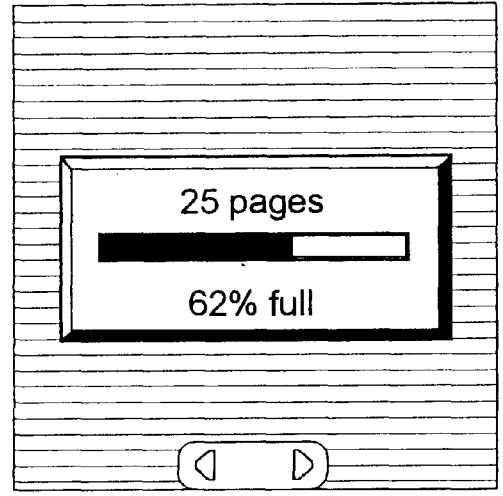
Figure 8D:
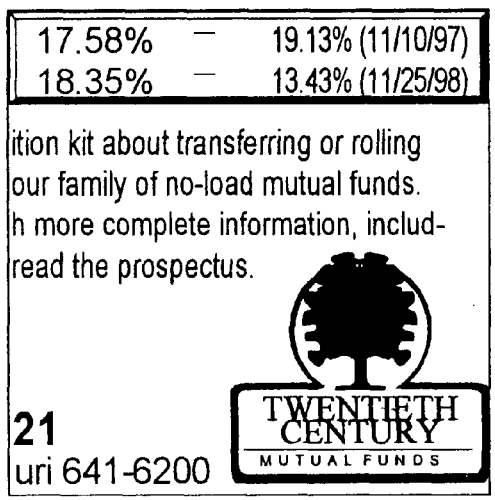
FIG. 8D illustrates a zoom view of a captured image on the display screen of FIG. 1A.
Figure 8C:
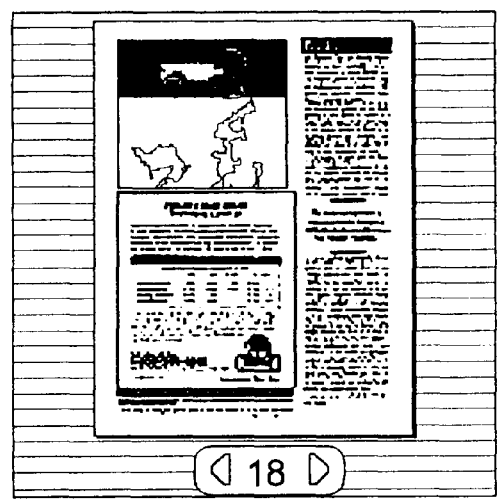
FIG. 8C illustrates a thumbnail view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. For example, FIGS. 8A and 8B show a memory usage indicator icon for the cases where memory 64 is empty (i.e., no captured pages in memory) and where memory 64 holds 25 captured pages. In FIG. 8C, thumbnail view module 82 presents an entire captured page on display 24. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be manipulated as an individual unit. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions through text and animation for operating appliance 22 and context sensitive instructions for performing a specific operation. The operation of help utility module 102 will be discussed in detail hereinafter. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
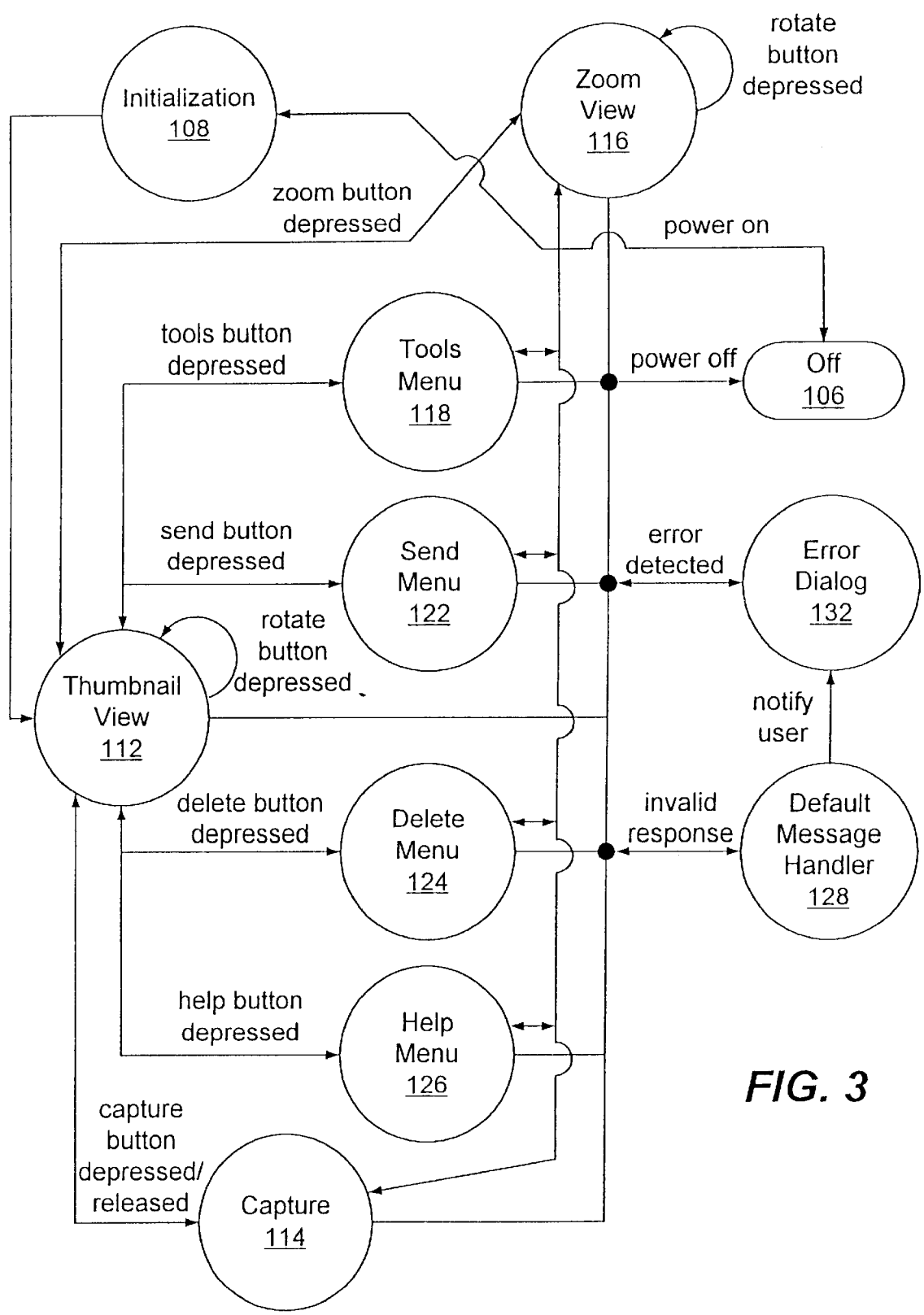
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28.

Figure 4A:
FIGS. 4A and 4B illustrate the tools menus displayed on the display screen of FIG. 1A.
Figure 4B:
Figure 5:
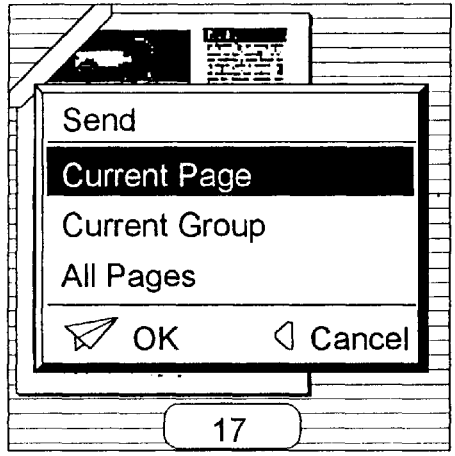
FIG. 5 illustrates the send menu displayed on the display screen of FIG. 1A.
Figure 6:
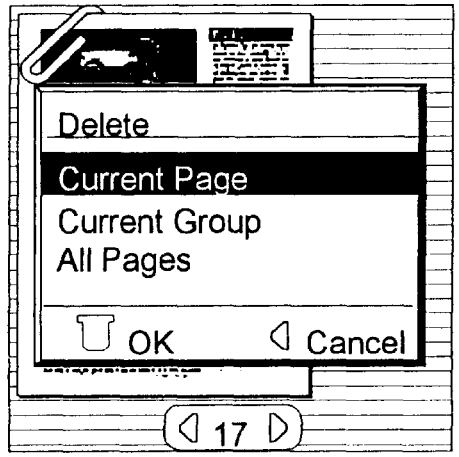
FIG. 6 illustrates the delete menu displayed on the display screen of FIG. 1A.
Figure 7:
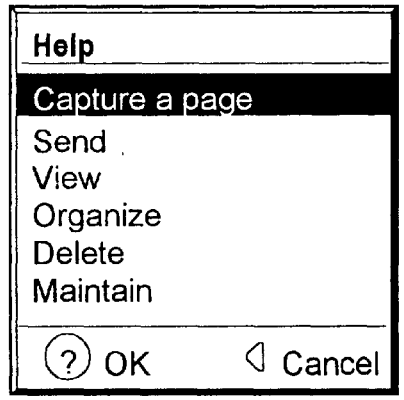
FIG. 7 illustrates the help menu displayed on the display screen of FIG. 1A.

From thumbnail view state 112 or zoom view state 116, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

An invalid response by the user (i.e., user presses an inactive button) will result in a transition to the default message handler state 128 where the user response is interpreted through the message that was generated internally. Frequently, the invalid response by the user will simply be ignored. Nevertheless, depending on the button that was invoked and the current state of application software 70, a transition is sometimes made to the error dialog state 132 to notify the user of their error via a message or graphic (e.g., a blinking icon) on display 24. Alternatively, error dialog state 132 can be entered directly if application software 70 detects an error in the execution of a valid operation. The most common example of this is when the user follows an improper capture path with appliance 22 during the image capture process.

Figure 9A:
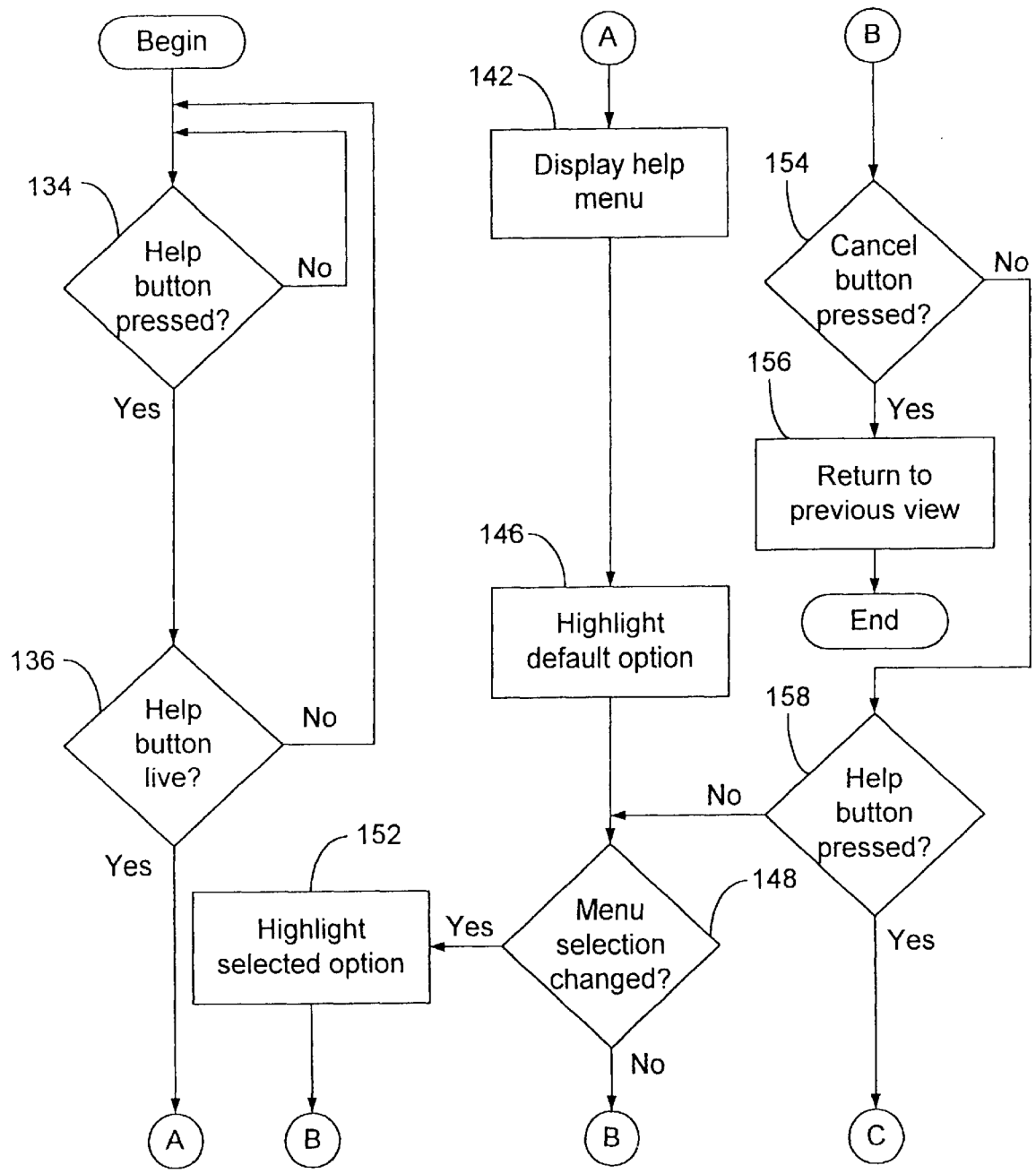
FIGS. 9A, 9B, and 9C collectively illustrate a flow chart describing the operation of the help utility software module of FIG. 2.

The features provided by the help utility module 102 will be described hereafter with frequent reference to (a) the architecture and operation of the application software 70 of FIG. 2; (b) the flow charts of FIGS. 9A, 9B, and 9C; and (c) the help menu and dialog illustrations of FIGS. 7 and 11.

Operation of the User Help Feature

The help utility feature of appliance 22 (see FIG. 1A) is exercised through help button 36, which displays the help menu illustrated in FIG. 7. Thus, as represented by decision diamond 134 in FIG. 9A, the process begins with menu/navigation interface module 104 (see FIG. 2) processing a message indicating that help button 26 has been activated. Depending on the current state of application software 70, this response may not be valid as indicated by decision diamond 136. If help button 36 is not currently active or live, application software 70 will ignore the help request. If, however, help button 36 is active, the process continues by following termination A where the help menu is exhibited on display 24 (see FIG. 1A) in step 142 as shown in FIG. 7. The first option is highlighted as the default help topic in step 146 as depicted in FIG. 7.

Referring now to FIG. 7, six help topics are offered to the user for their review: information on capturing a page, information on sending captured pages to another device or appliance, such as a printer or computer, information on viewing captured pages, information on organizing captured pages into groups; information on deleting captured pages; and information on maintaining appliance 22. It should be understood that this selection of help topics is used to illustrate a help utility for a capture and communication appliance 22. Inasmuch as the help utility of the present invention is applicable to alternative devices and appliances that could benefit from a real time, interactive user help capability that provides instruction through both textual dialogs and animation, the content and number of help topics will clearly vary from application to application.

Figure 12A:
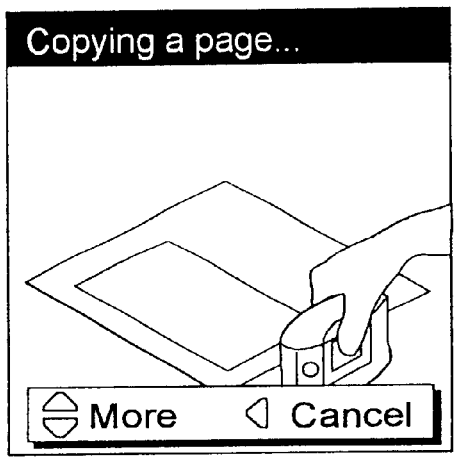
FIGS. 12A–12B depict an improper capture path using the appliance of FIGS. 1A–1D.
Figure 12B:
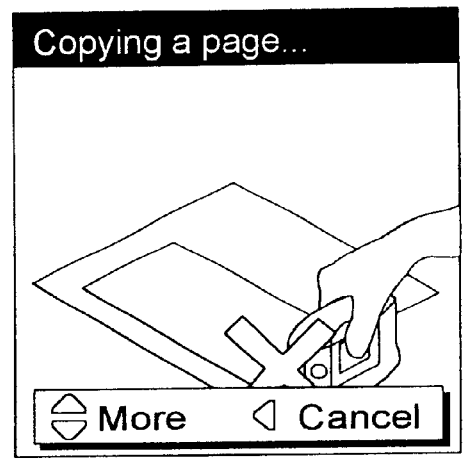
Figure 13A:
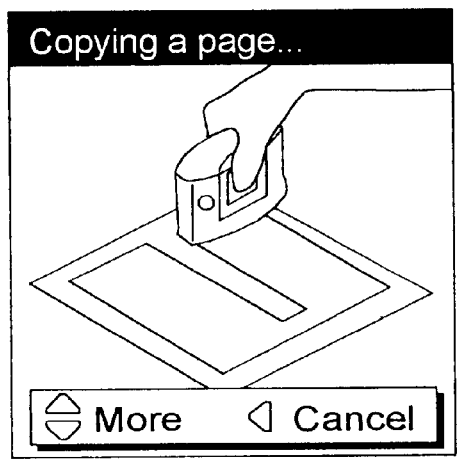
FIGS. 13A–13B depict another improper capture path using the appliance of FIGS. 1A–1D.
Figure 13B:
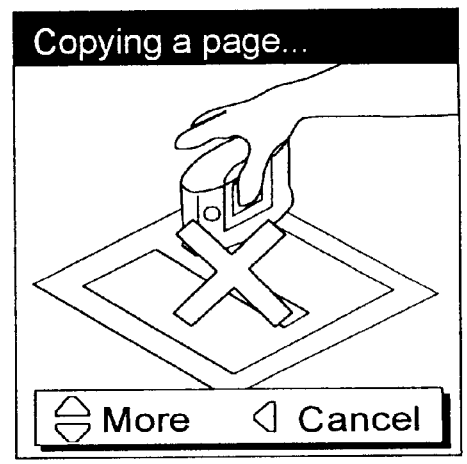

The first topic regarding capturing a page with appliance 22 provides a textual description of the scanning process. Moreover, to illustrate the proper technique for executing a successful page or image capture, an instructional animation is also included that demonstrates the preferred capture path and motion. Scenes from this animation are shown in FIGS. 11A through 11D. Incorrect capture techniques are also demonstrated in the animation for contrast. For example, FIGS. 12A, 12B, 13A, and 13B are scenes from animation showing incorrect capture techniques. Specifically, FIGS. 12A and 12B illustrate an errant image capture in which the user leaves the target with appliance 22. FIGS. 13A and 13B demonstrate an incorrect capture path in which the user fails to overlap the two paths made across the target page thus failing to capture the entire image. Because a user must be able to successfully capture a page before the other features of appliance 22 can be fully utilized, this topic is chosen as the default in the help menu in the preferred embodiment.

The second help topic discusses procedures involved in sending or transmitting a page or group of pages to another device such as a printer or computer. Information on the send menu (see FIG. 5), which is accessed through send button 26, and the appliance's communication ports is provided in this help dialog.

The third help topic is directed towards information on viewing captured pages both in thumbnail view mode and in zoom view mode. This help topic includes instructions on how to operate navigation buttons 42, 44, 46, and 48 to display captured pages on display 24 and the operation of zoom button 28 to review a captured page in greater detail.

The fourth help topic provides the user with information on attaching captured images to one another to form a group and on how to detach one or more images from an existing group. The attach and detach features are accessed through the tools menu shown in FIGS. 4A and 4B.

The fifth help topic provides the user with information on deleting a page or group of pages from memory 64. Use of the delete menu (see FIG. 6), which is accessed through delete button 34 is discussed in this help topic.

Finally, the sixth help topic covers general information on maintaining appliance 22 such as a customer support contact number should the user have a question or encounter a problem that they cannot resolve. Other information such as instructions on how to install or recharge the appliance's battery could also be provided under this help topic.

An alternative help topic for appliance 22 is to provide the user with information on how to set the copy mode or capture mode for appliance 26. In the preferred embodiment, appliance 26 is designed to operate in a normal mode or a picture mode. Normal mode is used for capturing text while picture mode is used for capturing pictures, images, or graphics. Normal mode is much less memory intensive, which allows appliance 26 to hold approximately five times the number of pages that could be held if the pages were captured in picture mode. This help topic provides instructions on how to select the copy or capture mode through the tools menu illustrated in FIGS. 4A and 4B.

Figure 10:
FIG. 10 illustrates a multi-screen help dialog displayed on the display screen of FIG. 1A.
Figure 10:
Figure 11A:
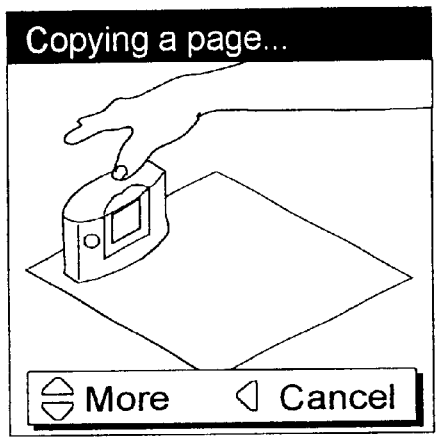
FIGS. 11A–11D depict a proper capture path using the appliance of FIGS. 1A–1D.
Figure 11B:
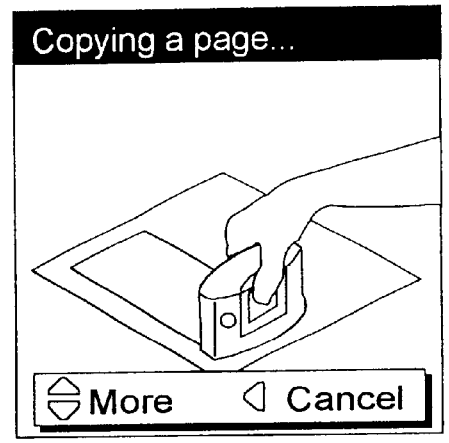
Figure 11C:
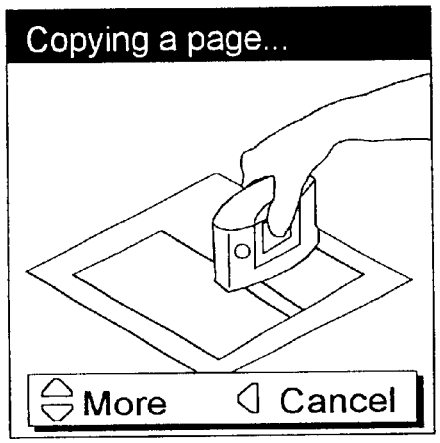
Figure 11D:
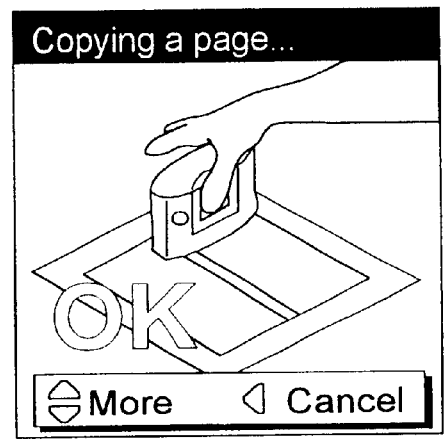

The help topics discussed in the foregoing are used in the preferred embodiment of the present invention. Nevertheless, alternative and/or additional topics can be used to tailor the help utility to meet the needs of the user community and the addition and changing of product features and functionality. Moreover, in the preferred embodiment, an instructional animation is used only with the help topic directed towards capturing a page. It is envisioned, however, that a skilled programmer or designer may use either a textual dialog, an animation, or both in providing information on any of the identified help topics. The use of animation is particularly useful for those topics or concepts that are difficult to explain in words or would require several screens or pages of text to convey all of the information. In addition to textual dialog and animation, still graphics can also be used to convey instructional information on the various features of appliance 22. It should also be noted that the number of help topics need not be limited by the space available on display 24. For example, if the list of help topics needs to overflow to an additional screen(s), an icon representing navigation buttons 42 and 44 (see FIG. 1A) can be used as shown in FIG. 10 that prompts the user to use these buttons to scroll to a previous or following screen for more topics. Finally, in the preferred embodiment of the present invention, help is provided to the user through a menu of help topics. Other approaches can be adopted, however, to provide the user with help in operating appliance 22. For example, help utility module 102 can be designed to cooperate with other application software 70 modules to provide a context sensitive help capability. Specifically, the help dialog or animation displayed by help utility module 102 would be determined by the current state of application software 70. Thus, if help button 36 is invoked by the user when the send menu is currently on display with the current page highlighted as shown in FIG. 5, a dialog and/or animation directed to sending the current page could be displayed on display 24. Once the user exits the help dialog and/or animation, application software 70 returns to the previous display. The context sensitive help capability could be used in place of or in addition to the menu driven help topic design used in the preferred embodiment.

Returning now to FIG. 9A, the user can choose between the aforementioned help topics using navigation buttons 42 and 44 as indicated by decision diamond 148. As the user moves between topics, the currently selected option will be highlighted in step 152. Once a selection is made, the help process continues at termination B. As shown in FIG. 7, a topic from the help menu can be confirmed using help button 36 or the menu can be exited through activation of navigation button 46. Thus, at decision diamond 154, if the help menu is exited, the help process ends at step 156 by removing the menu from display 24 and returning the display to the previous view (i.e., the view on display prior to invocation of help button 36). Otherwise, if a topic is confirmed through invocation of help button 36, control will be transferred to help utility module 102 at decision diamond 158.

Figure 9B:
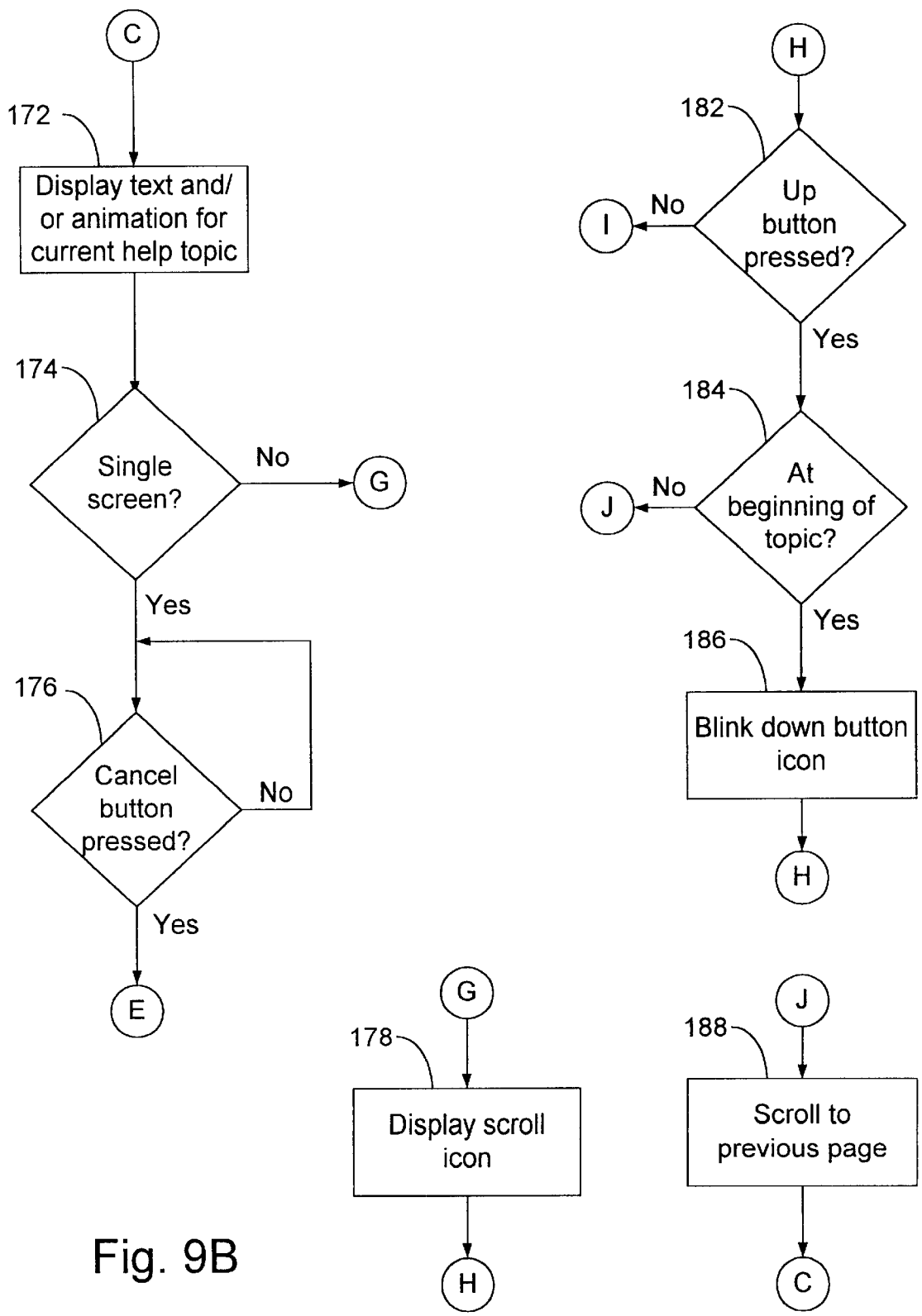

Following termination C in FIG. 9B, help utility module 102 is designed in the preferred embodiment to integrate animation and text into a single scrolling help topic, which is displayed on display 24 in step 172. The animations scrolls with the text, but only play when they are completely visible on the screen. Advantageously, by integrating the animation with the text the user can review the entire help topic contents in the same context (i.e., through scrolling), When an animation is partly visible or while the user is scrolling, only frame one of the animation is shown. When the animation is completely visible on display 24, it will play through once leaving the final scene depicted on the display 24. Alternatively, the animation could be designed to play continuously in an endless loop. In a third alternative embodiment, an additional button could be added to appliance 22 or one of the existing buttons could be defined to replay an animation that has completed.

A determination is made at decision diamond 174 whether the help function for the chosen topic can be displayed on a single screen or if additional screens are also available for display. If the help function consists only of a single screen displayed in step 172, then appliance 22 will remain in this state until the user exits the help dialog through invocation of navigation button 46, which is determined at decision diamond 176. Upon exiting the help dialog, the help process follows termination E to return to the previous view (i.e., the view on display prior to invocation of help button 36) in step 168.

The help process continues at termination G from decision diamond 174 if additional text and/or animations are available for display. As shown in FIG. 10, a scroll icon comprising two opposing arrows is displayed in step 178 to prompt the user that additional information is available on previous or subsequent screens through operation of navigation buttons 42 and 44. In the preferred embodiment, the scroll icon is designed to emulate the user interface by which a scroll (i.e., displaying information stored across a plurality of logical screens or pages) is performed, which is through operation of navigation buttons 42 and 44. Following termination H to decision diamond 182, a determination is made whether the user has activated navigation button 42 to scroll the display up. If the first page or screen of help information is currently on display at decision diamond 184, the bottom arrow of the scroll icon is made to blink in step 186 to inform the user that they are currently viewing the first screen of multiple screens or pages of help information.

If the first screen of help information is not on display at decision diamond 184, the help process continues at termination J where the previous screen of text or animation is displayed in step 188.

Figure 9C:
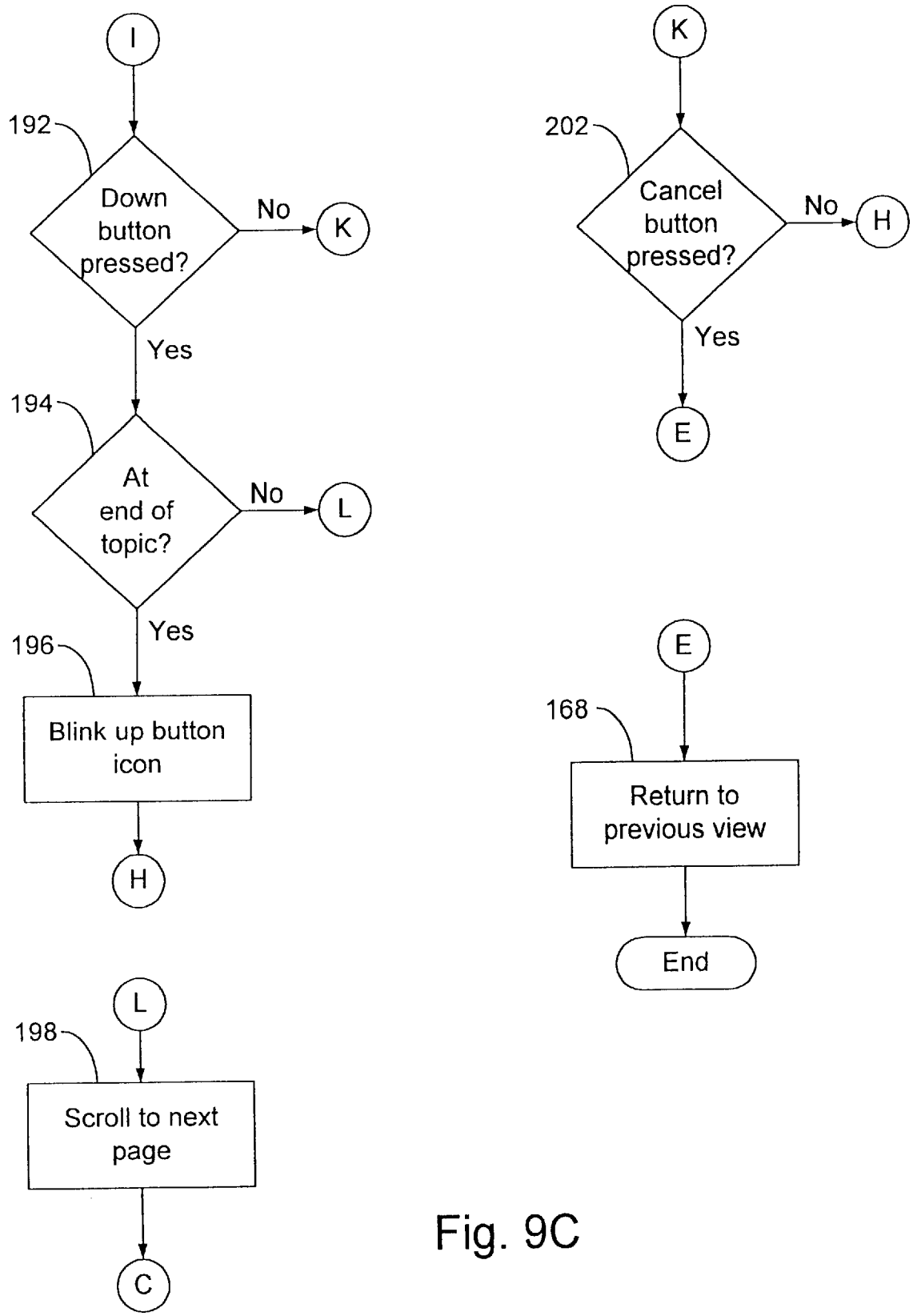

If navigation button 42 was not invoked at decision diamond 182, termination I is followed to FIG. 9C where a determination is made at decision diamond 192 whether navigation button 44 has been depressed to scroll the display down. Decision diamond 194 and step 196 are analogous to decision diamond 184 and step 186 in FIG. 9B. If the last page or screen of help information is currently on display at decision diamond 194, the top arrow of the scroll icon is made to blink in step 196 to inform the user that they are currently viewing the last screen of multiple screens or pages of help information. If the last screen of help information is not on display at decision diamond 194, the help process continues at termination L where the subsequent screen of text or animation is displayed in step 198.

Finally, if neither navigation button 42 nor 44 was invoked as determined by decision diamonds 182 and 192 respectively, the help process continues at termination K where it is determined at decision diamond 202 whether the help menu has been exited through invocation of navigation button 46. Upon exiting the help dialog or animation, the help process follows termination E to return to the previous view in step 168 as discussed hereinbefore. Thus, as illustrated in FIG. 10 through valid button icons, unless an overriding event occurs such as a power off or an activation of image capture button 54 (see FIG. 1B), help utility module 102 waits for invocation of one of the scroll navigation buttons 42 and 44 or cancel navigation button 46 as represented by terminations H, I, and K.

It is important to emphasize that while the present invention has been illustrated herein with reference to an image capture and communication appliance, the GUI and human-machine interface features of the present invention are applicable to any device appliance, or software program. Examples of such devices include digital cameras, video recording devices (e.g., video stored in digital form), audio recording devices (e.g., audio stored in digital form), portable fax machines, desktop, laptop, and hand-held computing devices, and virtually any software program. Furthermore, it is envisioned that the methods disclosed herein for providing interactive help to a user of an image capture and communication appliance can likewise be used in any device, appliance, or software program that could benefit from a real-time user help capability and possesses the requisite hardware to implement the user interface.

Application software 70, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The principles of the present invention have been disclosed herein as embodied in a portable, hand-held image capture and communication appliance that provides the flexibility of traditional hand-held scanners yet offers an array of intelligent features not heretofore known in the art. For example, the capture and communication appliance includes a help capability that provides users with a list of topics on which instruction is provided. Advantageously, user help is provided through both textual dialogs, graphics, and animation. A GUI is also provided that, in conjunction with the help utility, allows even a novice user to successfully operate the appliance with minimal or no outside instruction. It is these intelligent features that place the present invention in a new class of products known as electronic information appliances that merge the functionality of electronic peripheral devices, such as image scanners, with the processing capabilities and graphical interface used in computers.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A hand-held image capture and communication appliance, comprising:

a photoelement array for acquiring image data;

a memory for saving said image data;

a processor in communication with said memory;

a display in communication with said processor for exhibiting said image data; and program code stored in said memory and executed by said processor, said program code comprising a help utility module for providing a user with information on operating said appliance, wherein said help utility module further comprises a code segment for displaying text and still graphics on said display.

2. The appliance of claim 1, wherein said text and still graphics further comprises at least text instructing said user to keep said hand-held image capture and communication appliance in contact with a page to be scanned.

3. The appliance of claim 1, wherein said text and still graphics further comprises at least text instructing said user to press and hold a copy button residing on said hand-held image capture and communication appliance while copying a page to be scanned.

4. The appliance of claim 1, wherein said text and still graphics further comprises at least text instructing said user to overlap a first portion of a page to be scanned with a second portion of a page to be scanned by a predefined overlap distance.

5. The appliance of claim 1, wherein said text and still graphics further comprises at least text instructing said user to release a copy button residing on said hand-held image capture and communication appliance when copying a page to be scanned is completed.

6. The appliance of claim 1, wherein said text and still graphics is text instructing said user to keep said hand-held image capture and communication appliance in contact with a page to be scanned, text instructing said user to press and hold a copy button residing on said hand-held image capture and communication appliance while copying said page to be scanned, text instructing said user to overlap a first portion of a page to be scanned with a second portion of a page to be scanned by a predefined overlap distance or text instructing said user to release said copy button residing on said hand-held image capture and communication appliance when copying said page to be scanned is completed.

7. A hand-held image capture and communication appliance, comprising:
   a photoelement array for acquiring image data;
   a memory for saving said image data;
   a processor in communication with said memory;
   a display in communication with said processor for exhibiting said image data; and
   program code stored in said memory and executed by said processor, said program code comprising a help utility module for providing a user with information on operating said appliance, wherein said help utility module further comprises a code segment for displaying an animation on said display.

8. The appliance of claim 7, wherein said code segment further comprises an animation segment for displaying a portion of the animation, wherein the animation segment first shows at least a user's hand holding and moving said hand-held image capture and communication appliance over a first portion of a page of paper, and then shows at least said user's hand holding and moving said hand-held image capture and communication appliance over a second portion of a page of paper, said second portion overlapping said first portion, so that said user understands proper operation of said hand-held image capture and communication appliance.

9. The appliance of claim 8, wherein said code segment further comprises textual information displayed at the conclusion of the animation, said textual information indicating to said user that the animation illustrates proper operation of said hand-held image capture and communication appliance.

10. The appliance of claim 9, wherein said textual information displayed at the conclusion of the animation includes at least the word "OK".

11. The appliance of claim 7, wherein said code segment further comprises an animation segment for displaying a portion of the animation, wherein the animation segment first shows at least a user's hand holding and moving said hand-held image capture and communication appliance across a portion of a page of paper; and then shows at least said user's hand holding and moving said hand-held image capture and communication appliance off of said page of paper so that said user understands improper operation of said hand-held image capture and communication appliance.

12. The appliance of claim 11, wherein said code segment further comprises textual information displayed at the conclusion of the animation, the textual information indicating to said user that the animation illustrates improper operation of said hand-held image capture and communication appliance.

13. The appliance of claim 12, wherein said textual information displayed at the conclusion of the animation includes at least the symbol "X".

14. The appliance of claim 7, wherein said code segment further comprises an animation segment for displaying a portion of the animation, wherein the animation segment first shows at least a user's hand holding and moving said hand-held image capture and communication appliance over a first portion of a page of paper, and then shows at least said user's hand holding and moving said hand-held image capture and communication appliance over a second portion of a page of paper, said second portion not overlapping said first portion, so that said user understands improper operation of said hand-held image capture and communication appliance.

15. The appliance of claim 14, wherein said code segment further comprises textual information displayed at the conclusion of the animation, the textual information indicating to said user that the animation illustrates improper operation of said hand-held image capture and communication appliance.

16. The appliance of claim 15, wherein said textual information displayed at the conclusion of the animation includes at least the symbol "X".

17. A hand-held image capture and communication appliance, comprising:
   capturing means for acquiring image data;
   storage means for saving said image data;
   processing means in communication with said storage means;
   display means in communication with said processing means for exhibiting said image data; and
   program code stored in said storage means and executed by said processing means, said program code comprising a help utility module for providing a user with information on operating said appliance wherein said help utility module comprises a code segment for displaying text and still graphics on said display.

18. The appliance of claim 17, wherein said text and still graphics is text instructing said user to keep said hand-held image capture and communication appliance in contact with a page to be scanned, text instructing said user to press and hold a copy button residing on said hand-held image capture and communication appliance while copying said page to be scanned, text instructing said user to overlap a first portion of a page to be scanned with a second portion of a page to be scanned by a predefined overlap distance or text instructing said user to release said copy button residing on said hand-held image capture and communication appliance when copying said page to be scanned is completed.

19. A hand-held image capture and communication appliance, comprising:
   capturing means for acquiring image data;
   storage means for saving said image data;
   processing means in communication with said storage means;
   display means in communication with said processing means for exhibiting said image data; and
   program code stored in said storage means and executed by said processing means, said program code comprising a help utility module for providing a user with information on operating said appliance wherein said help utility module further comprises a code segment for displaying an animation on said display.

20. The appliance of claim 19, wherein said code segment further comprises an animation segment for displaying a portion of the animation, wherein the animation segment first shows at least a user's hand holding and moving said hand-held image capture and communication appliance over a first portion of a page of paper, and then shows at least said user's hand holding and moving said hand-held image capture and communication appliance over a second portion of a page of paper, said second portion overlapping said first portion, so that said user understands proper operation of said hand-held image capture and communication appliance.

21. The appliance of claim 20, wherein said code segment further comprises textual information displayed at the conclusion of the animation, the textual information indicating to said user that the animation illustrates proper operation of said hand-held image capture and communication appliance.

22. The appliance of claim 21, wherein said textual information displayed at the conclusion of the animation includes at least the word "OK".

23. The appliance of claim 19, wherein said code segment further comprises an animation segment for displaying a portion of the animation, wherein the animation segment first shows at least a user's hand holding and moving said hand-held image capture and communication appliance across a portion of a page of paper; and then shows at least said user's hand holding and moving said hand-held image capture and communication appliance off of said page of paper so that said user understands improper operation of said hand-held image capture and communication appliance.

24. The appliance of claim 23, wherein said code segment further comprises textual information displayed at the conclusion of the animation, the textual information indicating to said user that the animation illustrates improper operation of said hand-held image capture and communication appliance.

25. The appliance of claim 24, wherein said textual information displayed at the conclusion of the animation includes at least the symbol "X".

26. The appliance of claim 19, wherein said code segment further comprises an animation segment for displaying a portion of the animation, wherein the animation segment first shows at least a user's hand holding and moving said hand-held image capture and communication appliance over a first portion of a page of paper, and then shows at least said user's hand holding and moving said hand-held image capture and communication appliance over a second portion of a page of paper, said second portion not overlapping said first portion, so that said user understands improper operation of said hand-held image capture and communication appliance.

27. The appliance of claim 26, wherein said code segment further comprises textual information displayed at the conclusion of the animation, the textual information indicating to said user that the animation illustrates improper operation of said hand-held image capture and communication appliance.

28. The appliance of claim 27, wherein said textual information displayed at the conclusion of the animation includes at least the symbol "X".

29. A method for providing help information to a user of a hand-held image capture and communication appliance having a built-in display, comprising the steps of:
displaying a menu comprising a plurality of help topics on said display;
processing a user selection of one of said help topics; and
displaying a textual dialog containing help information that is correlated with said topic selected by the user.

30. The method of claim 12, further comprising the steps of:
activating at least one navigation button corresponding to a logical scroll direction; and
scrolling said display to communicate a plurality of screens of information in response to said logical scroll direction entered by the user when activating said navigation button.

31. The method of claim 30, further comprising the step of:
providing an icon representative of a user interface on said appliance for scrolling between screens of information on said display.

32. The method of claim 31, wherein said icon comprises a pair of opposing arrows with each arrow representing a unique said logical scroll direction and further comprising the step of:
emphasizing one of said arrows representing a correct logical scroll direction in response to an invalid scroll direction entered by the user.

33. The method of claim 32, wherein said arrow representing said correct logical scroll direction is emphasized through blinking.

34. The method of claim 29, wherein said step of displaying a textual dialog is textual dialog instructing said user to keep said hand-held image capture and communication appliance in contact with a page to be scanned, textual dialog instructing said user to press and hold a copy button residing on said hand-held image capture and communication appliance while copying said page to be scanned, textual dialog instructing said user to overlap a first portion of a pace to be scanned with a second portion of a page to be scanned by a predefined overlap distance or textual dialog instructing said user to release said copy button residing on said hand-held image capture and communication appliance when copying said page to be scanned is completed.

35. A method for providing help information to a user of a hand-held image capture and communication appliance having a built-in display, comprising the steps of:
displaying a menu comprising a plurality of help topics on said display;
processing a user selection of one of said help topics; and
displaying an animation conveying help information that is correlated with said help topic selected by the user.

36. The method of claim 35, wherein said animation plays endlessly until interrupted by the user.

37. A method for providing help information to a user of a system having a built-in display, comprising the steps of:
displaying a menu comprising a plurality of help topics on the display;
processing a user selection of one of said help topics; and
displaying help information that is correlated with said help topic selected by integrating text, still graphics, and animation into a single presentation.

38. A computer readable medium having a program for manipulating image data acquired by a hand-held image capture and communication appliance, said program code comprising:
logic configured for displaying a menu comprising a plurality of help topics on said display;
logic configured for processing a user selection of one of said help topics; and
logic configured for displaying a textual dialog and still graphics containing help information that is correlated with said topic selected by the user.

39. The computer readable medium of claim 38, further comprising:
logic configured for scrolling said display to communicate a plurality of screens of information in response to a logical scroll direction entered by the user.

40. The computer readable medium of claim 39, further comprising:

logic configured for providing an icon representative of a user interface on said appliance for scrolling between screens of information on said display.

41. The computer readable medium of claim 38, wherein the logic configured for displaying textual dialog is logic instructing said user to keep said hand-held image capture and communication appliance in contact with a page to be scanned, logic instructing said user to press and hold a copy button residing on said hand-held image capture and communication appliance while copying a page to be scanned, logic instructing said user to overlap a first portion of said page to be scanned with a second portion of a page to be scanned by a predefined overlap distance or logic instructing said user to release said copy button residing on said hand-held image capture and communication appliance when copying said page to be scanned is completed.

42. A computer readable medium having a program for manipulating image data acquired by a hand-held image capture and communication appliance, said program code comprising:

logic configured for displaying a menu comprising a plurality of help topics on said display;

logic configured for processing a user selection of one of said help topics; and logic configured for displaying an animation conveying help information that is correlated with said topic selected by the user.

43. The computer readable medium of claim 42, wherein the logic configured for displaying an animation further includes:

logic configured to display a first portion of the animation showing at least a user's hand holding and moving said held-held image capture and communication appliance over a first portion of a page of paper; and logic configured to display a second portion of the animation showing at least said user's hand holding and moving said hand-held image capture and communication appliance over a second portion of a page of paper, said second portion overlapping said first portion, so that said user understands proper operation of said hand-held image capture and communication appliance.

44. The computer readable medium of claim 43, further comprising logic configured for displaying textual information at the conclusion of the animation, the textual information indicating to said user that the animation illustrates proper operation of said hand-held image capture and communication appliance.

45. The computer readable medium of claim 44, wherein logic configured for displaying textual information at the conclusion of the animation further includes logic configured for displaying at least the word "OK".

46. The computer readable medium of claim 42, wherein the logic configured or displaying an animation further includes:

logic configured to display at least a user's hand holding and moving said hand-held image capture and communication appliance across a portion of a page of paper; and logic configured to display at least said user's hand holding and moving said hand-held image capture and communication appliance off of said page of paper so that said user understands improper operation of said hand-held image capture and communication appliance.

47. The computer readable medium of claim 46, further comprising logic configured for displaying textual information at the conclusion of the animation, the textual information indicating to said user that the animation illustrates improper operation of said hand-held image capture and communication appliance.

48. The computer readable medium of claim 47, wherein logic configured for displaying textual information at the conclusion of the animation further includes logic configured for displaying at least the symbol "X".

49. The computer readable medium of claim 42, wherein the logic configured for displaying an animation further includes:

logic configured to display at least a user's hand holding and moving said hand-held image capture and communication appliance over a first portion of a page of paper; and logic configured to display at least a user's hand holding a moving said hand-held image capture and communication appliance over a second portion of a page of paper, said second portion not overlapping said first portion, so that said user understands improper operation of said hand-held image capture and communication appliance.

50. The computer readable medium of claim 49, further comprising logic configured for displaying textual information at the conclusion of the animation, the textual information indicating to said user that the animation illustrates improper operation of said hand-held image capture and communication appliance.

51. The computer readable medium of claim 50, wherein logic configured for displaying textual information at the conclusion of the animation further includes logic configured for displaying at least the symbol "X".

52. A computer readable medium having a program for providing help information to a user of a system having a built-in display, said program comprising:

logic configured for displaying a menu comprising a plurality of help topics on the display;

logic configured for processing a user selection of one of said help topics; and logic configured for displaying help information that is correlated with said help topic selected by integrating text, still graphics, and animation into a single presentation.

53. A method for providing help information to a user using a hand-held image capture and communication appliance having a built-in display, comprising the steps of:

displaying a textual dialog containing help information that is correlated with a help topic selected by said user;

instructing said user to keep said hand-held image capture and communication appliance in contact with a page to be scanned;

instructing said user to press and hold a copy button residing on said hand-held image capture and communication appliance while copying said page to be scanned;

instructing said user to overlap a first portion of a page to be scanned with a second portion of a page to be scanned by a predefined overlap distance; and instructing said user to release said copy button residing on said hand-held image capture and communication appliance when copying said page to be scanned is completed.

54. A method for providing help information to a user using a hand-held image capture and communication appliance having a built-in display, comprising the step of displaying an animation conveying help information that is correlated with a help topic selected by said user, the step of displaying the animation further comprising the steps of:

displaying a first portion of the animation showing at least a user's hand holding and moving said hand-held image capture and communication appliance over a first portion of a page of paper; and displaying a second portion of the animation showing at least said user's hand holding and moving said hand-held image capture and communication appliance over a second portion of a page of paper, said second portion overlapping said first portion, so that said user understands proper operation of said hand-held image capture and communication appliance.

55. The method of claim 54, further comprising the step of displaying textual information at the conclusion of the animation, the textual information indicating to said user that the animation illustrates proper operation of said hand-held image capture and communication appliance.

56. The method of claim 55, wherein the step of displaying textual information at the conclusion of the animation further includes the step of displaying at least the word "OK".

57. A method for providing help information to a user using a hand-held image capture and communication appliance having a built-in display, comprising the step of displaying an animation conveying help information that is correlated with a help topic selected by said user, the step of displaying the animation further comprising the steps of:

displaying at least a user's hand holding and moving said hand-held image capture and communication appliance across a portion of a page of paper; and displaying at least said user's hand holding and moving said hand-held image capture and communication appliance off of said page of paper so that said user understands improper operation of said hand-held image capture and communication appliance.

58. The method of claim 57, wherein the step of displaying the animation further comprises the step of displaying textual information at the conclusion of the animation, the textual information indicating to said user that the animation illustrates improper operation of said hand-held image capture and communication appliance.

59. The method of claim 58, wherein the step of displaying textual information at the conclusion of the animation further includes the step of displaying at least the symbol "X".

60. A method for providing help information to a user using a hand-held image capture and communication appliance having a built-in display, comprising the step of displaying an animation conveying help information that is correlated with a help topic selected by said user, the step of displaying the animation further comprising the steps of:

displaying at least a user's hand holding and moving said hand-held image capture and communication appliance over a first portion of a page of paper; and displaying at least a user's hand holding and moving said hand-held image capture and communication appliance over a second portion of a page of paper, said second portion not overlapping said first portion, so that said user understands improper operation of said hand-held image capture and communication appliance.

61. The method of claim 60, wherein the step of displaying textual information at the conclusion of the animation, the textual information indicating to said user that the animation illustrates improper operation of said hand-held image capture and communication appliance.

62. The method of claim 61, wherein the step of displaying textual information at the conclusion of the animation further includes the step of displaying at least the symbol "X".

* * * * *

UNITED STATES PATENT AND TRADEMARK OFFICE
CERTIFICATE OF CORRECTION

PATENT NO.    : 6,549,304 B1
DATED         : April 15, 2003
INVENTOR(S)   : James C. Dow et al.

It is certified that error appears in the above-identified patent and that said Letters Patent is hereby corrected as shown below:

Column 16,
Line 28, delete "pace" and insert therefor -- page --

Column 17,
Line 56, delete "or" and insert therefor -- for --

Column 18,
Line 19, delete "a" and insert therefor -- and --

Signed and Sealed this

Twelfth Day of October, 2004

JON W. DUDAS
*Director of the United States Patent and Trademark Office*